United States Patent [19]

Flaig et al.

[11] Patent Number: 5,631,510
[45] Date of Patent: May 20, 1997

[54] ELECTRIC DRIVE WITH BRAKES, IN PARTICULAR FOR HOISTS, LIFTING DEVICES OR POSITIONING TRANSPORTING SYSTEMS

[75] Inventors: Heinz Flaig, Bochum; Josef Saeftel, Castrop-Rauxel; Harald Bitsch; Herbert Dreher, both of Witten; Axel Hauschild, Dortmund; Johannes Kluge, Wetter; Anton Münzebrock, Dortmund; Dirk Schulte, Schwerte; Roland Staggl, Wetter; Karl Zacharias, Schwerte, all of Germany

[73] Assignee: Mannesmann Aktiengesellschaft, Dusseldorf, Germany

[21] Appl. No.: 335,467

[22] Filed: Nov. 7, 1994

[30] Foreign Application Priority Data

Nov. 5, 1993 [DE] Germany .................. 43 38 570.2

[51] Int. Cl.⁶ .................................................. H02K 7/10
[52] U.S. Cl. .................................................. 310/77; 310/42
[58] Field of Search .................................. 310/103, 77, 93, 310/209, 104, 42; 188/171

[56] References Cited

U.S. PATENT DOCUMENTS

| Re. 23,362 | 5/1951 | Hallander | 188/171 |
|---|---|---|---|
| 2,434,034 | 1/1948 | Chapman | 188/172 |
| 2,461,759 | 2/1949 | Nelson et al. | 188/171 |
| 2,512,565 | 6/1950 | Hallander | 188/171 |
| 3,712,426 | 1/1973 | Gilbrech | 188/164 |
| 4,432,446 | 2/1984 | Okano et al. | 192/84 C |
| 4,445,596 | 5/1984 | Waters et al. | 188/171 |
| 4,734,604 | 3/1988 | Sontheimer et al. | 310/76 |
| 5,036,368 | 7/1991 | Nakamura | 335/272 |
| 5,055,086 | 10/1991 | Raterman et al. | 453/10 |
| 5,189,324 | 2/1993 | Beck et al. | 310/51 |
| 5,233,252 | 8/1993 | Denk | 310/254 |

FOREIGN PATENT DOCUMENTS

| 933189 | 4/1948 | France . |
|---|---|---|
| 1303888 | 6/1975 | Germany . |

*Primary Examiner*—Steven L. Stephan
*Assistant Examiner*—Jonathan Link
*Attorney, Agent, or Firm*—Cohen, Pontani, Lieberman, Pavane

[57] ABSTRACT

An electric drive with brakes, in particular for hoists, lifting devices or positioning transporting systems, having a brake disk which is movable axially on a motor shaft so as to rotate therewith via a toothing. The brake disk has brake faces at both sides and can be pressed against a stationary counter-brake disk by a spring force. An electromagnetic device is provided which, when connected to current, causes the brake to be released against the spring force. The electromagnetic device has a.c. magnets and E-shaped magnet coil yokes. The counter-pole faces associated with the coil yokes are arranged at magnet yokes which can move angularly on all sides so that the counter-pole faces can be aligned at the end faces of the E-shaped magnet coil yokes located opposite thereto when current is applied to the a.c. magnet.

10 Claims, 4 Drawing Sheets

(A-B)

ELECTRIC DRIVE WITH BRAKES, IN PARTICULAR FOR HOISTS, LIFTING DEVICES OR POSITIONING TRANSPORTING SYSTEMS

BACKGROUND OF THE INVENTION

1. Field of the Invention

The invention is directed to an electric drive with brakes, in particular for hoists, lifting devices or positioning transporting systems. The brakes have a brake disk which is movable axially on a motor shaft so as to rotate therewith via a toothing and which has brake faces at both sides. The brake disk can be pressed against stationary opposing or counter-brake disks by a spring force. An electromagnetic device is also provided which, when connected to current, causes the brake to be released against the spring force.

2. Description of the Prior Art

Direct current brakes are most commonly used for such drives, however, they have time constants that can be improved only at additional cost (e.g. DE 13 03 888).

In hoists, lifting devices and positioning transport systems, it is advantageous to use drives with fast braking.

Furthermore, in known a.c. brake systems the pole faces are rigidly attached and machined so as to have a small magnet gap when leaving the factory. Due to additional mechanical machining work, these systems are expensive and extremely sensitive to wear-induced changes in the magnet gap, which adversely affects operation. Additionally, an irritating hum normally develops after a certain period of time.

SUMMARY OF THE INVENTION

Accordingly, it is an object of the present invention to provide an electric drive with faster brakes than available in the prior art.

Pursuant to this object, and others which will become apparent hereafter, one aspect of the present invention resides in an electric drive having an electromagnetic device with a.c. magnets, and E-shaped magnet coil yokes. Counter-pole faces are arranged at magnet yokes which can move angularly on all sides and can be aligned at the end faces of the E-shaped magnet coil yokes located opposite thereto when current is applied to the a.c. magnet. The advantage achieved by the invention consists particularly in that the magnet system is successfully closed along the entire pole face with a simple construction. Without this reliable closing of the pole gap, a loud hum would occur in a.c. magnets and an electromagnetic device of this type comprising a.c. magnets would be troublesome.

An advantageous construction of the invention has two separate magnet coil yokes with a common winding arranged on both sides of the motor shaft. Accordingly, the fastening of the two separate magnet coil yokes at a tie plate withstands high loads and is geometrically exact. On the other hand, it is possible to adjust the pole faces to their counter-pole faces without the application of moment.

According to another embodiment, the E-shaped magnet yokes are fastened resiliently on all sides to a tie plate forming a stationary counter-brake disk. Accordingly, the E-shaped magnet yokes can be positioned on the tie plate, e.g. via a central rubber member, in a positive-locking manner but without application of substantial moment via tiltable crossbars or the like.

In a further embodiment of the invention a spring element is placed underneath the magnet yokes on the housing side to cushion the impact occurring when the magnet is closed. This dampening of impact results in improved switching acoustics and, above all, in a longer useful life of the pole faces.

Pursuant to a particularly advantageous embodiment of the invention, the two E-shaped magnet yokes are held by means of tiltable bars which are fastened by retaining studs or stay bolts and inserted into recesses in the magnet yokes corresponding to the cross section of the bar. The magnet yokes are supported on the side of the tie plate remote of the brake face by spring elements. This permits movement, i.e. adjustments of the pole surfaces, on all sides.

According to an additional embodiment of the invention, the winding passing around the two magnet coil yokes is enclosed by a plastic housing which forms guide channels for the E-shaped magnet coil yokes within its interior. In this way, the design is adapted to one of the functions.

An additional construction includes an annular collar which resiliently absorbs the axial movement of the tie plate. The collar is provided between the tie plate and an annular shoulder of the brake housing. The pole faces of the magnet system are advantageously protected from the inevitable frictional wear of the brake faces by this annular collar.

In a particularly advantageous further development of the invention the brake disk provided with brake linings on both sides has an injection molded plastic hub which is provided in the guide bore hole with a toothing that enables axial displacement. The plastic hub provides favorable sliding properties without frictional corrosion on the motor shaft in that the brake disk is constructed as a composite part of steel and plastic. In so doing, a steel toothing can be enclosed in its entirety by plastic. On the other hand, the steel disk, which only engages in a positive connection with the shaft toothing if the plastic toothing should become worn, offers protection against puncture or buckling if the plastic hub should break or experience thermal overloading. A redundant system is formed in this way.

Furthermore, the invention supports the magnet yokes with a pretensioned spring element. This lessens the impact shock when the a.c. magnet closes.

Another feature of the invention is that guide pins extend outwardly through the tubular rivets, which enables a simple manual release of the brake.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
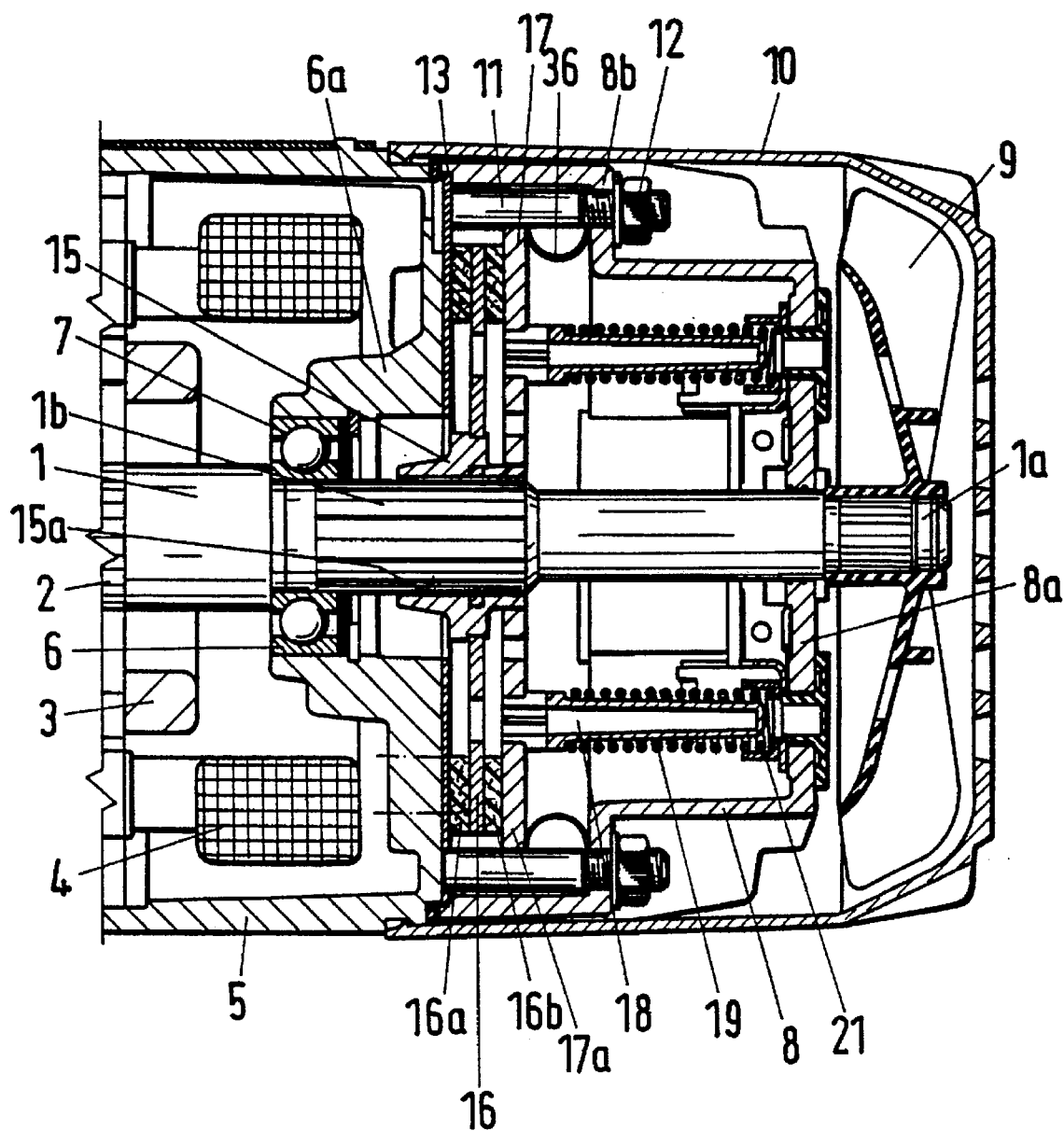
FIG. 1 shows an axial longitudinal section through the brake assembly of the electric drive pursuant to the present invention.

The electric drive with brakes of the present invention can be used particularly for hoists, lifting devices or positioning transporting systems. In a conventional manner, as shown in FIG. 1, the electric drive has a motor shaft 1 with short-circuiting rings 3 fastened to a rotor 2 and with a stator winding 4 in a stator housing 5. The motor shaft 1 is rotatably supported in a flange 6a of the rotor bearing 6 by means of conventional roller bearings 7. The motor shaft 1 penetrates a brake housing 8 and ends in a shaft rod 1a that supports a fan 9. The parts described above are substantially closed by means of a fan cowl 10.

The brake housing 8 is fastened at the stator housing 5 by a shay bolt 11 that penetrates an annular shoulder 8b, and a threaded nut 12 on the end of the bolt 11 projecting from the shoulder. A friction disk 13 is clamped between the station housing 5 and the bolt 11.

In the region of the friction disk 13, the motor shaft 1 has a toothing 1b which provides for positive engagement with a brake disk 16 which is freely displaceable in the axial direction. The brake disk 16 carries friction linings 16a and 16b and is clamped between a tie plate 17a and the friction disk 13 under the influence of pressure springs 19 when the brakes are applied.

Figure 2:
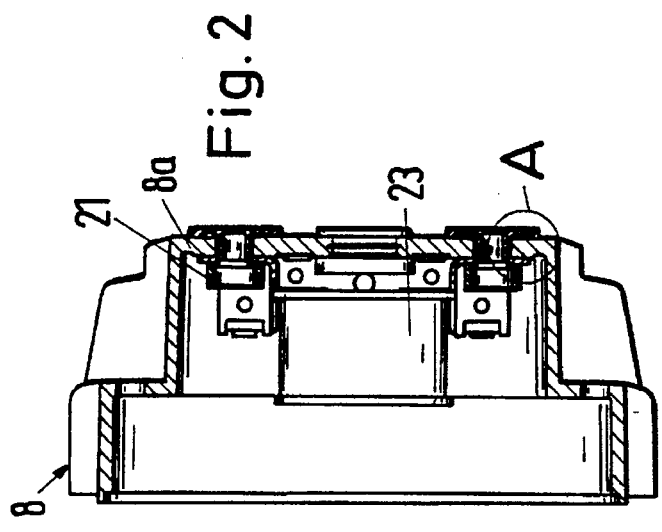
FIG. 2 shows an axial longitudinal section through the brake housing which is shown in detail.
Figure 2A:
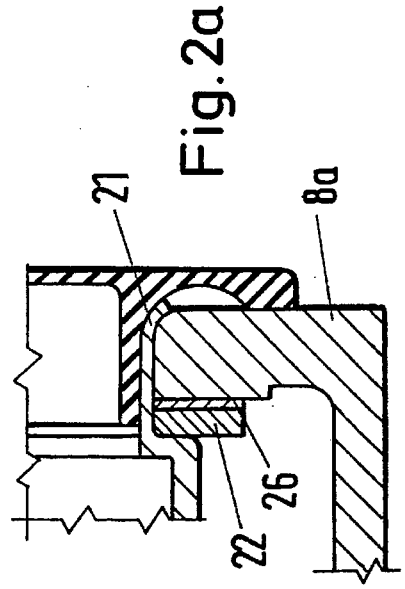
FIG. 2a is an enlarged view of a detail A from FIG. 2.

The pressure springs 19 are guided by guide pins 18 and are positioned, on the brake housing side, by hollow or tubular rivets 21 which hold the coil 23 of an a.c. magnet 24 via retaining members 22 and at the same time are fastened by a pretensioned flat bending spring 26, which damps the impact shock when the magnet is closed, to the base 8a of the brake housing 8 (FIG. 2a).

Figure 3:
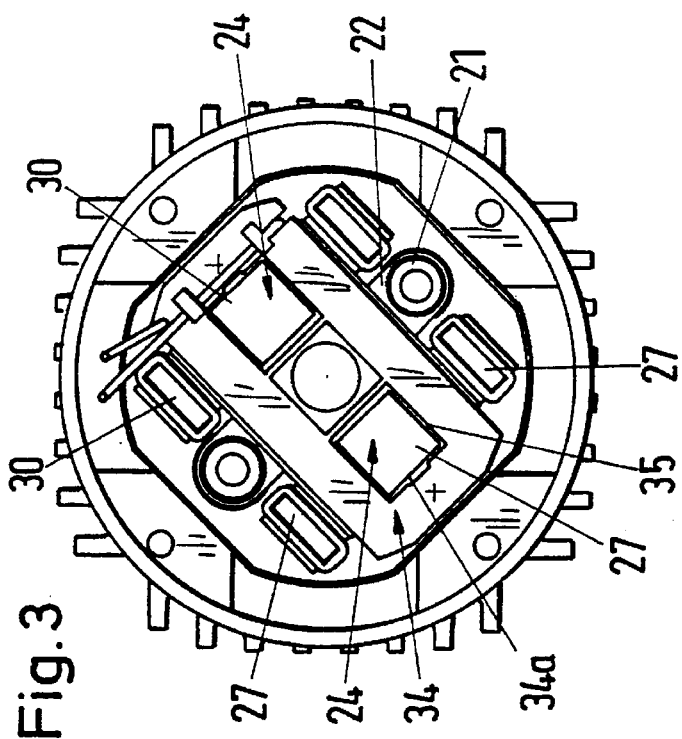
FIG. 3 shows a front view according to FIG. 2.

The electromagnetic device which causes the brake to be released against the force of the pressure springs 19 when connected to current has an a.c. magnet 24 with E-shaped magnet coil yokes 27 around which the coil 23 is arranged (FIGS. 2 and 3). Counter-pole faces 28 associated with the E-shaped magnet coil yokes 27 are located at magnet yokes 29 which are likewise E-shaped and are supported in a special manner on the counter-brake disk 17 which acts as the tie plate 17a.

The magnet yokes 29 (FIGS. 4 and 5) can be aligned at end faces 30 (FIG. 3) of the E-shaped magnet coil yokes 27 when current is applied to the a.c. magnet 24 (FIGS. 2 and 3). Two separate magnet coil yokes 27 with a common coil 23 are arranged at both sides of the motor shaft 1.

Figure 4:
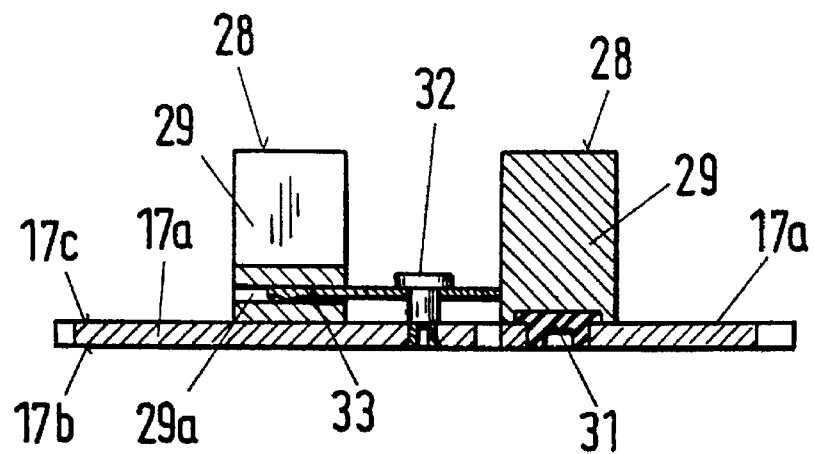
FIG. 4 shows a vertical section A-B, according to FIG. 5, through the tie plate of the E-shaped magnet yoke.
Figure 5:
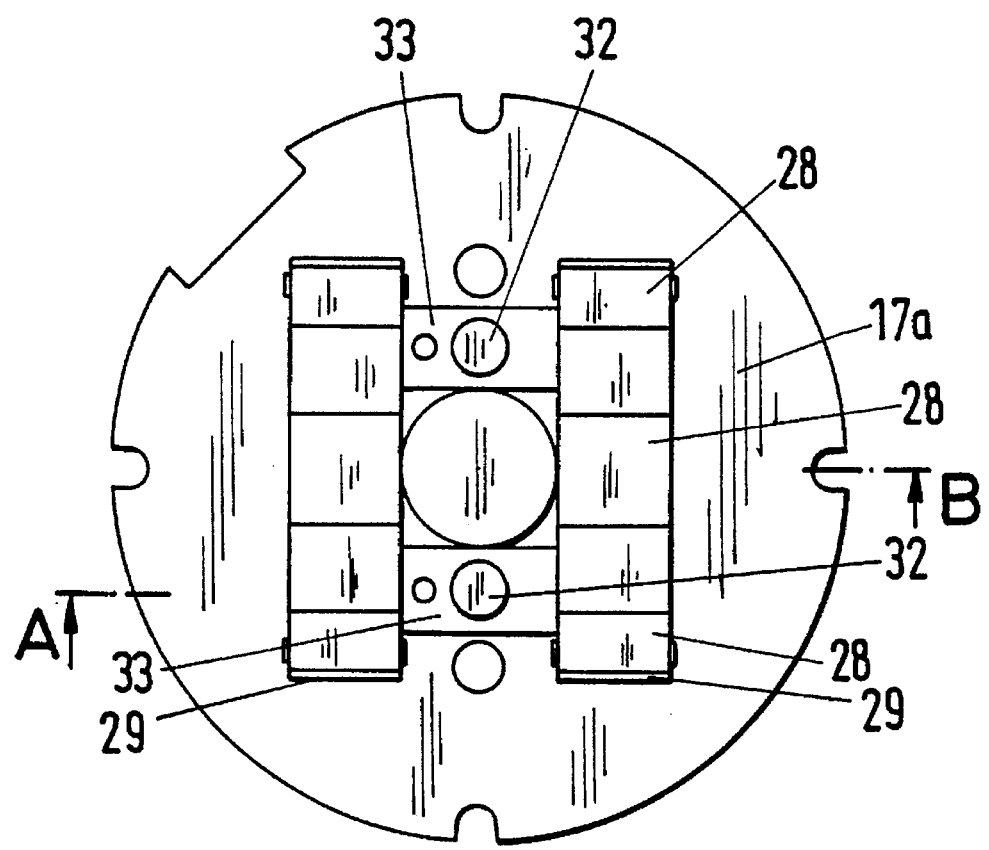
FIG. 5 shows a top view of the tie plate according to FIG. 4.

The E-shaped magnet yokes 29 are fastened in a resilient manner on all sides to the tie plate 17a forming the stationary counter-brake disk 17 (FIGS. 4 and 5). The magnet yokes 29 are supported on the tie plate 17a by a rubber spring element 31.

In the embodiment shown in FIGS. 4 and 5, the two E-shaped magnet yokes 29 are held by tillable bars 33, each of which is fastened by stay bolts 32 and inserted in recesses 29a corresponding to the cross section of the bar 33. The magnet yokes 29 are accordingly supported via the spring elements 31 and the bars 33 on a side 17c of the tie plate 17a remote of the brake face 17b.

Furthermore, the coil 23 passing around the two magnet coil yokes 27 is enclosed by a plastic housing 34. Guide channels 35 for the E-shaped magnet coil yokes 27 and magnet yokes 29 are formed in the interior 34a of the plastic housing 34.

Figure 6:
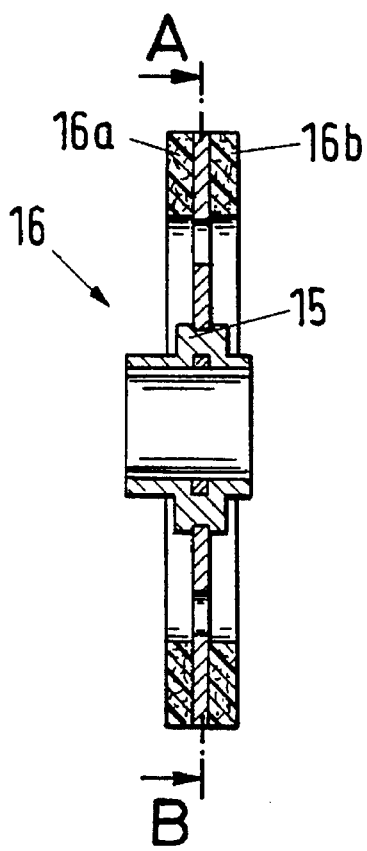
FIG. 6 shows a section A-B, according to FIG. 7, of the brake disk.
Figure 7:
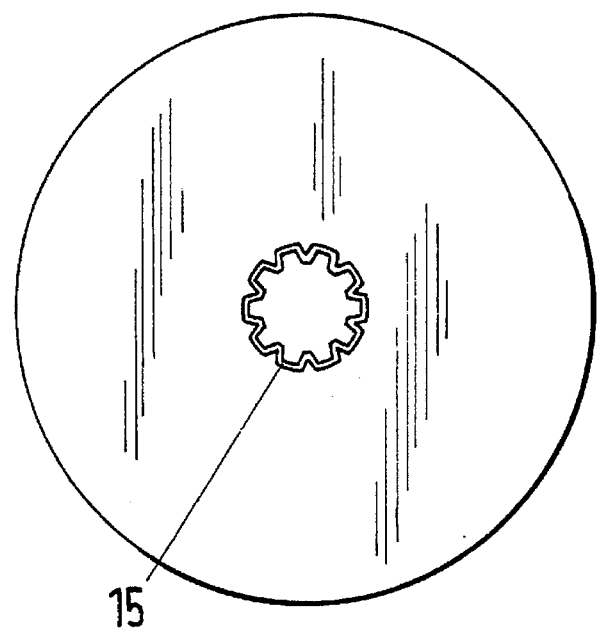
FIG. 7 shows a front view of the brake disk.

An annular collar 36 which resiliently absorbs the axial movement of the tie plate 17a and is protected against frictional wear is interposed between the tie plate 17a and the annular shoulder 8b of the brake housing 8. The brake disk 16, with the brake linings 16a, 16b at both sides, has an injection-molded plastic hub 15 provided in its guide bore hole 15a with the plastic toothing 1b that corresponds to the toothing of the motor shaft 1 to enable axial displacement. The plastic toothing 1b completely encloses the steel toothing of the shaft, which toothing has the same shape (FIGS. 6 and 7).

The invention is not limited by the embodiments described above which are presented as examples only but can be modified in various ways within the scope of protection defined by the appended patent claims.

We claim:

1. An electric drive with brakes, comprising: a motor shaft having a toothing thereon; a brake disk having a brake face on each side and being mounted on the shaft toothing so as to be axially movable on the motor shaft and so as to rotate therewith; stationary counter-brake disks, one of the counter-brake disks being arranged on each side of the brake disk; spring means for pressing the brake disk into engagement with the counter-brake disks; and electromagnetic means responsive to current for releasing the disks against spring force of the spring means, the electromagnetic means including at least two a.c. magnets, two separate E-shaped magnet coil yokes having end faces, and two E-shaped magnet yokes having counter-pole faces arranged opposite the end faces of the magnet coil yokes, the magnet yokes being arranged and adapted to be angularly movable when current is applied to the a.c. magnets so that the counter-pole faces of the magnet yokes are alignable with the end faces of the E-shaped magnet coil yokes without application of moment.

2. An electric drive according to claim 1, and further comprising a common coil winding on the magnet coil yokes, the coil yokes being arranged on both sides of the motor shaft.

3. An electric drive according to claim 1, wherein one of the stationary counter-brake disks is a tie plate, the E-shaped magnet yokes being resiliently fastened on the tie plate.

4. An electric drive according to claim 3, and further comprising a spring element arranged between the magnet yokes and the tie plate.

5. An electric drive according to claim 3, wherein the two E-shaped magnet yokes have recesses therein, and further comprising tillable bars and stay bolts that fasten the tiltable bars to the tie plate, the bars being inserted into the recesses in the magnet yokes, and still further comprising spring elements adapted to support the magnet yokes on a side of the tie plate remote of the brake face.

6. An electric drive according to claim 2, and further comprising a plastic housing arranged and adapted to enclose the winding passing around the two magnet coil yokes, the plastic housing having an interior which forms guide channels for the E-shaped magnet coil yokes.

7. An electric drive according to claim 3, and further comprising a brake housing in which the tie plate, the brake disk and the electromagnetic means are housed, the brake housing having an annular shoulder, and still further comprising an annular collar provided between the tie plate and the annular shoulder of the brake housing so as to resiliently absorb axial movement of the tie plate.

8. An electric drive according to claim 1, wherein the brake disk has a central guide bore hole, and further comprising a plastic injection-molded hub mounted in the guide bore hole and having a toothing that corresponds to the shaft toothing to permit axial displacement.

9. An electric drive according to claim 1, and further comprising a pretensioned spring element arranged under the magnet yokes so as to support the magnet yokes on one of the counter-brake disks.

10. An electric drive according to claim 1, wherein one of the counter-brake disks is a tie plate and the spring means includes pressure springs, and further comprising a brake housing in which the brake disk, counter-brake disks and electromagnetic means are housed, tubular rivets being arranged in a wall of the brake housing to support the pressure springs, and guide pins mounted to the tie plate so as to extend outwardly through the tubular rivets and coaxially with the pressure springs.

* * * * *